United States Patent Office 3,524,755
Patented Aug. 18, 1970

3,524,755
PROCESS FOR APPLYING A COATING
COMPOSITION TO A MICROPOROUS
MATERIAL
Jerome Hochberg, Nashville, Tenn., assignor to E. I. du Pont de Nemours and Company, Wilmington, Del., a corporation of Delaware
No Drawing. Filed Nov. 23, 1966, Ser. No. 596,450
Int. Cl. B44d 1/092
U.S. Cl. 117—47          6 Claims

ABSTRACT OF THE DISCLOSURE

A process for applying a liquid coating composition to a microporous material is provided for use in making non-mottled, uniform surface coatings. This process involves the application of a liquid coating composition to at least one surface of a microporous material after the surface micropores of the microporous material have been treated with wetting liquid in a way which causes about 5% to 99% of the void volume of the micropores to be filled with wetting liquid.

---

This invention concerns a process for applying a liquid coating composition to a microporous material and more particularly a process for applying a liquid coating composition to a surface of microporous coriaceous permeable sheet material which upon drying, results in a non-mottled and very uniform surface coating.

Although a variety of methods for coating articles with liquid coating compositions has been known for many years, these methods often do not result in a uniform non-mottled surface coating when they are used to coat a microporous material. For purposes of this invention, a mottled surface is considered to be one which contains visual non-uniformities which detract from the aesthetics of the surface appearance of a material and which can be measurable or non-measurable by instrumental techniques. Uniform non-mottled coatings are desirable in many instances, especially where the coating applied is a finish coating designed to add an aesthetic effect to the material coated. Apparently the poor uniformity of these coatings results because the liquid coating composition applied will not ordinarily wet or adhere uniformly to the micropore containing surface of the material. The problems encountered in obtaining a uniform non-mottled coating on the surface of a microporous material have long been recognized in the art.

According to this invention, there is provided a process for applying a liquid coating composition to a microporous material which, upon drying, results in a non-mottled very uniform coating upon the microporous material. This process comprises applying a liquid coating composition to at least one surface of a microporous material, which surface has micropores containing a wetting liquid which is present in the micropores in an amount sufficient to fill between about 5% and about 99% of the void volume of the micropores and subsequently drying the coating composition.

This invention offers many advantages over the coating methods previously known. One advantage is the excellent uniformity of the dry coating applied regardless of the method used to coat the microporous material. Another advantage is that the coating which results from the process of this invention is non-mottled. A still further advantage is the simplicity of the process which allows the process to be carried out economically and with a minimum of process control.

Liquid coating compositions are available in many forms. Some examples of those included within the scope of the term as used for this invention include pure liquids, mixtures of liquids, liquid emulsions, liquid dispersions, gels, solutions, etc. Those coating compositions particularly useful with this invention include water emulsion type coatings such as acrylic water based paints and solvent based systems. In selecting a solvent system, it is important to choose one that contains a solvent which does not attack the microporous material. Examples of solvents found suitable for use with this invention include toluene, alcohol, tetrahydrofuran and mixtures of these.

The process of this invention is applicable when the material to be coated is microporous. For purposes of this invention, a microporous material is considered to be a material containing many small pores—i.e., micropores. The word "microporous" is used in its standard technical sense and a good definition for "microporous" can be found in Hackh's Chemical Dictionary, 3rd ed., Blakiston Co., New York, 1953.

This invention is particularly useful for coating microporous coriaceous permeable sheet material. In general, such material acts in a sponge-like manner.

Microporous coriaceous permeable sheet material suitable for this invention can be prepared as is shown in Holden, U.S. Pat. 3,100,721, issued Aug. 13, 1963. A microporous impregnated needle-punched non-woven mat, 250 mils thick, of 1.25 denier heat shrunk polyethylene terephthalate staple fiber approximately 1½ inches in length is used as a substrate. The impregnant is a polymer disclosed in Example I of U.S. Pat. 3,100,721. The substrate is brought into contact with a woven interlayer fabric containing 65% poly(ethylene terephthalate) fibers and 35% cotton, the fabric having a count of 96 x 96 (Greige). The fabric is bleached, desized, double singed on each side and then stretched while wet from an initial width of 47 inches to a final width of 49 inches using a tenting frame. By this procedure, the fabric which initially had a tensile strength of 55 x 60 pounds per inch, a modulus of 17 x 6 pounds at 5% elongation and a break elongation of 26% x 36% is converted to a fabric having a tensile strength of 55 x 54 pounds per inch, a modulus of 10 x 7 pounds at 5% elongation, a break elongation of 25% x 25%, a smoothness factor of 14 mils, thickness of 5.5 mils and weight of 2.3 ounces per square yard. A 12½% solids polyvinyl chloride/polyurea dispersion in dimethylformamide and water (Ex. I, U.S. Pat. 3,100,721) is extruded onto the interlayer fabric from a hopper in an amount of 3.75 pounds dispersion per square yard of surface coated and the coated structure is then subjected to reduced pressure by passing the composite structure of substrate, interlayer and dispersion over a slot held at a pressure of five inches of mercury vacuum. During the time that the structure is exposed to reduced pressure (about 0.25 second), the polymeric dispersion is pulled through the interlayer and into the substrate, but sufficient polymer dispersion remains on the upper side of the interlayer to provide a coating 15 mils thick after coagulation. About 38 seconds after the composite leaves the reduced pressure zone, it is immersed in a tank containing water at room temperature and is bathed in this water for about three minutes. Finally, the resulting product is immersed in another water bath at 35° C. until the polymer is completely coagulated. Residual solvent is leached from the product by further bathing and then the coated substrate is subjected to hot air at 250° F. for 7 minutes.

The resulting product is a microporous coriaceous permeable sheet material. Other microporous coriaceous permeable sheet materials, as that term is used for this invention, include those shown in Holden, U.S. Pat. 3,100,721 issued Aug. 13, 1963.

The amount of wetting liquid which must be present in the micropores at the surface of the microporous material to produce a uniform non-mottled coating varies with the coating composition to be applied and the microporous material. As an upper limit, the amount must be less than the amount required to saturate or completely fill the void volume of the surface. When the surface is saturated, the wetting liquid does not impart the required capillary action which draws the carrier from the liquid coating composition into the micropores. Generally, any amount of wetting liquid below that required to fill 99% of the void volume at the surface of the microporous material will impart the required capillary effect. Preferably, the upper limit will be an amount of wetting liquid to fill below 70% of the void volume of the surface.

Microporous coriaceous permeable sheet material prepared as in Holden, U.S. Pat. 3,100,721 contains about 60% by weight of water on a wet basis when it is saturated. A preferred range for the amount of water which should be present for this process is 20% to 40% by weight on a wet basis. This range expresed as a percentage of the void volume filled at the surface of the microporous material is 33% to 67%. Within these limits, a very uniform and non-mottled coating can be applied by the techniques of this invention. Outside of this range, the uniformity is not as good and mottling occurs.

For other microporous materials, the preferable limits for a certain set of conditions can be analytically determined. As was stated above, these limits vary with the particular coating composition, wetting liquid and microporous material used.

It is important to realize that only the micropores at the surface of the microporous material to be coated have to contain a wetting liquid to realize the advantages of this process. In general, the depth to which the surface extends is defined as being sufficiently deep to allow the carrier of the liquid coating composition to be drawn into the micropores of the surface by the capillary effect produced by the presence of the wetting liquid. For example, to apply a dried coating of 0.1–1.5 mils upon the microporous coriaceous permeable sheet material of Holden, U.S. Pat. No. 3,100,721, the micropores of the material from the top of the surface to a depth of up to 15 mils usually contain wetting liquid. In this case, then, the surface of the microporous material is considered to extend to a depth of up to 15 mils. It is clear that this will vary with the particular microporous material used, the void volume of the pores which is filled, the particular coating composition used and other variables.

The word carrier is used to denote those portions of the liquid coating composition which do not remain after the coating is dried. Normally this includes everything in the liquid coating composition except the pigment and polymeric ingredients.

The amount of wetting liquid present can be conveniently calculated as a percentage of the void volume of the micropores at the surface of the microporous material which is filled. This procedure has been followed for this invention.

A wide range of wetting liquids has been found suitable for purposes of this invention. Any liquid or mixture of liquids which imparts the required capillary effect to the micropores at the surface of the material and which does not cause detrimental effects in the microporous material can be used. The capillary effect need only be strong enough to overcome the natural repellency effect that the micropores exhibit towards the liquid coating composition. When this capillary effect is present, the carrier in the liquid coating composition is drawn into the micropores causing a rapid change in the viscosity of the remaining liquid coating upon the surface of the microporous material and this results in a dried coating which is non-mottled and very uniform. Detrimental effects which the wetting liquid could potentially cause include but are not limited to solvation of the microporous material and undesirable chemical reactions between the wetting liquid and any of the other compositions present.

For many applications, water is a preferred wetting liquid. Water is plentiful, inexpensive, does not produce detrimental effects on most materials and is often present initially in microporous materials to some extent.

The surface of the microporous material can initially contain none of the wetting liquid, more or less than the desired amount, or an amount within the desired range. The procedure to be followed in obtaining the desired amount of wetting liquid in the surface micropores clearly depends upon how much is present initially. If the amount present initially is within the desired limits, nothing further need be done before the liquid coating composition is applied. If the surface micropores have less than the desired amount present, the microporous material can be exposed to a supply of the wetting liquid until it contains the desired amount. If, on the other hand, the micropores contain too much wetting liquid, the amount can be reduced by any ordinary treatment such as squeezing the material or drying it.

Application of the liquid coating composition to the microporous material can be accomplished by any method which brings the coating composition and material into contact. Some suitable techniques include dipcoating, roller coating, printing, spray coating, knife coating, curtain coating, electrostatic spray coating, etc.

In many instances, dipcoating is a preferred method of applying the liquid coating composition. Dipcoating has the advantage of simple process control. In addition, nearly 100% use of the liquid coating composition is obtained.

An important embodiment for the process of this invention is the application of a finish coating to a sheet of microporous coriaceous permeable material. The following test procedures can be used to determine three of the desirable physical characteristics of such coated sheet material.

PERMEABILITY (P.V.)

The purpose of this test is to determine the ability of the microporous material to transmit water vapor. Water vapor diffuses through the material because of a humidity differential, and the amount of moisture transmitted can be measured by weight differential.

A plastic jar, approximately two inches in diameter by 1¼ inches in depth, fitted with a plastic screw ring having a 1½ inch inside diameter, is filled with 12 mesh granular calcium chloride to within $1/16$ inch of its top. A cell is assembled by placing a two inch diameter sample of the coated microporous material on the mouth of the jar with its coated side down and screwing the ring down tightly. After being assembled, the cell is placed in a constant temperature-humidity cabinet and maintained at 21° C. dry bulb temperature and 90% relative humidity for two hours. The cell is removed from the cabinet and weighed to 0.01 gram on an analytical balance, after which it is returned to the cabinet and left there for exactly three hours. The cell is removed and weighed again and the results are used to calculate the permeability value (P.V.) in grams of water vapor per hour per 100 square meters of microporous material. For a more detailed description of this test, see Kanagy and Vickers, Journal of the Leather Chemists Association, 45, pp. 211–242 (Apr. 19, 1950).

FLEXIBILITY

The purpose of this test is to determine the flexibility of the coated material.

A 45 x 70 millimeter sample of the coated material is folded along its center line in the longitudinal direction with its coated side on the inside and then placed in a Bally Flexometer. The Bally Flexometer provides a rolling folding type of action in which a metal finger pushes into the sample from the back while the sample is rocked up and down. The samples are inspected under a 40 power microscope after 40,000 flexes. The appearance of cracks in the finish and also failure of actual finish by flaking, generally around the area where the metal finger is pushed into the material, is noted. Samples are graded from 0 to 5 against the following standards:

0—minor surface wrinkles
1—moderate surface wrinkles
2—severe surface wrinkles
3—severe surface wrinkles and minor coating cracks
4—severe surface wrinkles and severe surface cracks
5—surface peeling.

EDGEWEAR

The purpose of this test is to determine the resistance of the surface of coated microporous material to abrasion. Results are usually obtained for dry samples and wet samples (soaked in water at room temperature for two hours prior to testing). A sample two inches in width is wrapped around a one inch diameter arm extending from an edgewear abrasion test machine. The arm is weighted with a four pound weight. The test machine causes the surface of the sample to rub along the surface of a tightly stretched piece of number 10 cotton duck fabric. Wet edgewear samples are evaluated after 50 strokes and dry samples are evaluated after 1500 strokes. The following standards are used to rate the samples:

0—slight surface marks
1—very minor breaks at the top of the surface coating
2—minor breaks extending through the surface coating
3—severe breaks extending through the surface coating
4—severe breaks extending through the polymer coating
5—slight portion of interlayer showing
6—breaks extending through to interlayer
7—breaks extending to interlayer across one half of the sample's surface
8—breaks extending to interlayer across all of the sample's surface.

The process of this invention is useful for applying a liquid coating composition to microporous material in a manner which results in a non-mottled and very uniform dry coating upon the surface of the microporous material.

This process is especially useful for coating microporous materials wherein it is desired to impart excellent surface aesthetics to the microporous material. Microporous materials which require excellent surface aesthetics include microporous coriaceous permeable sheet materials which can be used as leather substitutes.

The following examples illustrate the invention. Unless otherwise specified, all parts and percentages are by weight.

Example I

A sheet of microporous coriaceous permeable material, prepared as shown in Example I, Holden, U.S. Pat. 3,100,721, issued Aug. 13, 1963, and as described above, originally is saturated with water. The material is squeezed between two rollers until the water content in the micropores at the surface to be coated is reduced to an amount sufficient to fill about 50% of the void volume at the surface.

The sheet material is dipcoated by running it at a speed of six yards per minute over a dip roll and through a dip pan containing a black acrylic latex emulsion which is comprised of:

| | Weight parts |
|---|---|
| Copolymer-water emulsion with 34.2 percent solids wherein the copolymer is comprised of 65 parts of ethyl acrylate and 35 parts of methyl methacrylate | 23.0 |
| Dispersion of carbon black in water which has 16 percent solids | 11.4 |
| Concentrated ammonia | 0.2 |
| Water | 65.4 |

The solids content of the black acrylic latex emulsion is ten percent and it has a pH of 10.0. Its viscosity, measured on the low range of a Brookfield viscosimeter, is 1.5 centipoises.

The wet coated sheet is dried in a tunnel dryer at a temperature of 280° F.–300° F.

After drying, the microporous sheet material has a non-mottled and very uniform coating with good jetness and gloss. The surface aesthetics are excellent. Average physical properties for twenty different samples of the coated material are as follows:

| | |
|---|---|
| P.V. | 2990 |
| Edgewear: | |
| Dry | 0 |
| Wet | 0 |

The flexibility of the dipcoated samples is comparable to that of samples coated by conventional techniques.

Example II

The effect of different surface wetting characteristics is examined in a series of runs using various substrates. The substrates comprise microporous coriaceous permeable sheet materials as shown in Example I, which have undergone different pre-treatments. Each of the substrates is coated exactly as in Example I with the same black acrylic latex emulsion as used in that example. The samples are further treated by the application of 0.05 ounce per square yard dried film weight of clear cellulose acetate butyrate. Before testing, each sample is embossed. The results are presented in Table I, including the initial condition of the substrate and the amount of dry coating applied by dipcoating.

TABLE I

| Sample substrate condition | Dipcoated finish weight (oz./yd.²) | P.V. |
|---|---|---|
| Dyed with Nigrosine (Acid Black 2) | 0.23 | 5,000 |
| Black pigmented | 0.30 | 4,400 |
| Undyed white | 0.30 | 3,800 |

All of the dried coated samples have very uniform non-mottled coatings with excellent surface aesthetics. The various surface characteristics have no noticeable effect on the coated surface aesthetics. The flexibility and wet and dry edgewear values for the coated samples are comparable to value obtained for samples coated by conventional techniques.

Example III

The microporous material and the operating procedure is the same as that used in Example I. The liquid coating compositions, however, are solvent based compositions. The physical properties of the dried coated material are as follows:

| Coating composition | P.V. | Flexibility | Edgewear Wet | Edgewear Dry |
|---|---|---|---|---|
| Urethane dissolved in tetrahydrofuran | 1,500 | 1 | 0 | 0 |
| Urethane dissolved in alcohol-toluene | 3,500 | 2 | 0 | 0 |

The surface aesthetics of the dried coatings are excellent.

Example IV

The liquid coating composition of Example I is adjusted to a solids content of 15%.

Dry microporous coriaceous permeable sheet material, as described above and in Holden, U.S. Pat. 3,100,721, issued Aug. 3, 1963, is wet with water until it contains an amount sufficient to fill about 50% of the void volume of the micropores at the surface of the material. The liquid coating composition is applied by means of a hand spray gun in varying amounts upon different samples.

When the coating is dry, some of the samples are further treated by applying 0.05 ounce per square yard dried film weight of clear cellulose acetate butyrate. Some samples are embossed after the cellulose acetate butyrate is dry.

In all instances, the values are comparable to those obtained for samples of the comparable microporous material coated by conventional techniques.

TABLE III

| Sample substrate condition | Wet or dry | Liquid printing composition | Number of printing passes | Cellulose acetate butyrate topcoat | Embossed | P.V. | Flexibility | Edgewear Wet | Edgewear Dry |
|---|---|---|---|---|---|---|---|---|---|
| White undyed | Wet | Urethane in alcohol-toluene | 1 | No | No | 4,400 | 0 | 8 | 8 |
| Do | Wet | do | 2 | No | No | 5,800 | 0 | 6 | 8 |
| Black pigmented | Wet | Black acrylic latex emulsion of Example I. | 3 | No | No | 4,700 | 4 | 6 | 0 |
| Do | Wet | do | 3 | No | Yes | 4,100 | 1 | 0 | 0 |
| Do | Wet | do | 3 | Yes | Yes | 4,100 | 2 | 0 | 0 |
| Do | Dry | do | 3 | No | Yes | 4,100 | 4 | 0 | 0 |
| Do | Dry | do | 3 | Yes | Yes | 4,700 | 3 | 0 | 0 |

All of these samples have dry coatings which are very uniform and non-mottled and have excellent surface aesthetics. The physical properties of the coated microporous material are shown in Table II together with the amount of dry coating applied to each sample. The flexibility and wet and dry edgewear values for the coated samples are comparable to those obtained for samples coated by conventional techniques.

TABLE II

| Weight of coating applied (oz./yd.²) | Cellulose acetate butyrate topcoat | Embossed | P.V. |
|---|---|---|---|
| 0.15 | No | No | 5,300 |
| 0.20 | No | No | 4,400 |
| 0.25 | No | No | 4,100 |
| 0.15 | No | Yes | 4,700 |
| 0.20 | No | Yes | 4,400 |
| 0.25 | No | Yes | 3,200 |
| 0.15 | Yes | No | 4,400 |
| 0.20 | Yes | No | 3,800 |
| 0.25 | Yes | No | 2,900 |
| 0.15 | Yes | Yes | 4,400 |
| 0.20 | Yes | Yes | 3,800 |
| 0.25 | Yes | Yes | 2,900 |

Example V

The microporous coriaceous permeable sheet material of Example I is printed with different liquid compositions. Each of the wet samples is squeezed until it contains an amount of water sufficient to fill about 50% of the void volume of the micropores at the surface to be printed. Some printing is done on dry samples to illustrate that no change occurs in physical properties if the microporous material is printed while it contains water.

The number of printing passes is varied and some of the samples are further treated after the printing by the application of 0.05 ounce per square yard dry film weight of clear cellulose acetate butyrate and embossing. The samples which had wet substrates have very uniform non-mottled dry surface coatings with excellent surface aesthetics. Those with dry substrates have non-uniform dry coatings and the surface aesthetics are poor due to the presence of streaking. The physical property data are presented in Table III. The few high values shown for Flexibility and Edgewear values are probably caused because in some instances the microporous material, prior to coating, is of poor quality and it is not expected that merely coating the material will improve these values.

What is claimed is:

1. A process for coating a synthetic microporous coriaceous vapor permeable sheet material which comprises a microporous layer of a chain-extended polyurethane firmly adhered to a porous fibrous layer impregnated with a polymer comprising
   (a) applying a thin layer of a liquid coating composition to the surface of the microporous layer of said sheet material; said microporous layer containing water in an amount sufficient to fill between about 33% to 67% of the void volume of the micropores in the microporous layer, said liquid coating composition consisting essentially of a film forming polymer and a liquid carrier selected from the group consisting of water and a solvent which does not degrade the microporous sheet material;
   (b) drying the coating composition applied in step (a) which produces a capillary effect and draws said coating composition into the microporous surface layer to form a coating on the surface of the microporous sheet material which is very uniform and non-mottled.

2. A process of claim 1 wherein the liquid coating composition is applied by dipcoating.

3. A process of claim 1 wherein the liquid coating composition is applied by spray coating.

4. A process of claim 1 wherein the liquid coating composition is applied by curtain coating.

5. A process of claim 1 wherein the liquid coating composition is applied by knife coating.

6. A process of claim 1 wherein the liquid coating composition is applied by roller coating.

References Cited

UNITED STATES PATENTS

| 1,203,303 | 10/1916 | Bickett. | |
| 1,892,083 | 12/1932 | Sidebotham | 117—5.5 |
| 3,000,757 | 9/1961 | Johnston et al. | 117—63 |
| 3,100,721 | 8/1963 | Holden | 117—135.5 |
| 3,140,143 | 7/1964 | Kaspaul et al. | 117—1.7 X |
| 3,190,765 | 6/1965 | Yuan | 117—63 |
| 3,190,766 | 6/1965 | Yuan | 117—63 |
| 3,208,875 | 9/1965 | Holden | 117—63 X |
| 3,262,805 | 7/1966 | Aoki | 117—76 X |
| 3,345,205 | 10/1967 | Baech | 117—161 X |
| 3,387,989 | 6/1968 | West et al. | 117—76 |
| 3,201,812 | 8/1965 | Chaplin | 12—146 |

WILLIAM D. MARTIN, Primary Examiner

M. R. LUSIGNAN, Assistant Examiner

U.S. Cl. X.R.

117—11, 15, 73, 76, 115, 161